Feb. 16, 1954     E. L. LAUNDER     2,669,153
RESILIENT COUPLING PIN
Filed Feb. 13, 1951
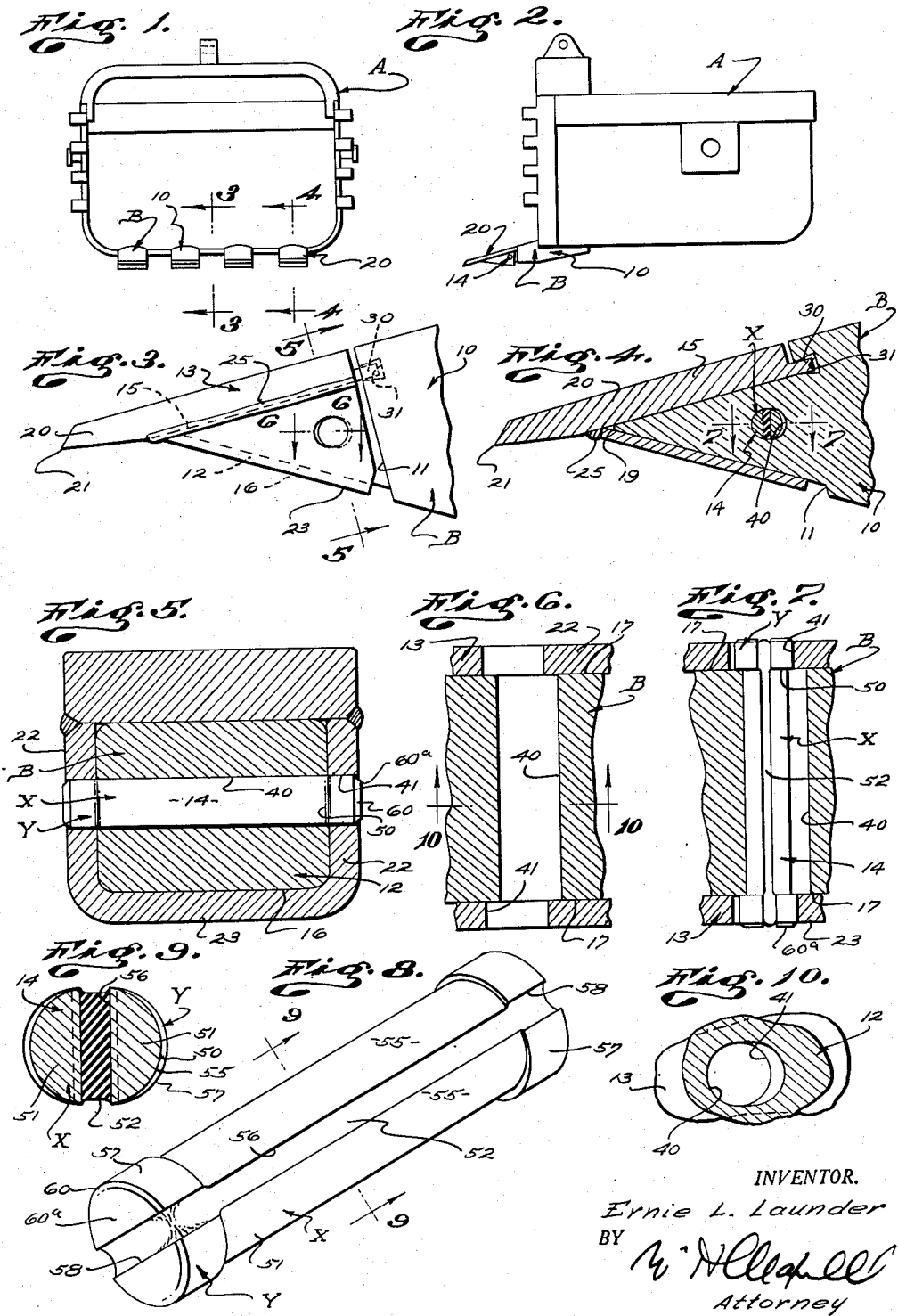
INVENTOR.
Ernie L. Launder
BY
Attorney Patented Feb. 16, 1954

2,669,153

UNITED STATES PATENT OFFICE 2,669,153

RESILIENT COUPLING PIN

Ernie L. Launder, Montebello, Calif., assignor to
H. & L. Tooth Company, Montebello, Calif., a
corporation of California Original application November 4, 1949, Serial No.
125,521. Divided and this application February
13, 1951, Serial No. 210,730

6 Claims. (Cl. 85—8.3)

This invention has to do with a fastener or with a construction wherein parts are joined by a unitary fastening device, and it is a general object of the invention to provide a practical, dependable fastener or joint construction characterized by a retainer of the pin type that is easily applied and removed, and which is effective and dependable in action.

This application is filed as a division of my copending application Serial No. 125,521, filed November 4, 1949, now Patent No. 2,568,075, entitled "Cap for Digger Tooth" in which I claim a digger tooth involving a fastener which is of the type claimed in this application.

Another object of the invention is to provide a fastener in which two like metal sections are joined in a unitary device by a body of rubber, so that the metal sections have limited universal movement relative to each other. In the fastener of the present invention the metal sections are not only alike, generally, but they are elongate in form and have like end portions, and the body of rubber occurs between the metal sections and connects them so that they have limited movement relative to each other.

Another object of the invention is to provide a fastener of the general character referred to in which the metal sections have like end enlargements that form inwardly facing shoulders, and have end faces that are exposed and suitable for engagement by a hammer, or other driving tool or implement.

Another object of the invention is to provide a fastener of the general character referred to in which the head end portions of each metal section of the fastener projects laterally of the longitudinal axis of the fastener so that they operate when applied or in working position to maintain the fastener in a predetermined rotative position.

Another object of the invention is to provide a pin type fastener of the general character referred to involving like metal sections and a rubber spreader between the sections, the sections and spreader being so related and proportioned as to substantially fill fastener receiving holes in the parts connected by the fastener.

It is a further object of this invention to provide a pin type fastener of the general type referred to which is such that it can be readily driven into and out of operating position where it connects relatively movable parts and which dependably remains in operating position unless deliberately pressed or driven therefrom. A feature of the fastener provided by the present invention is that it will dependably remain in operating position and is not loosened or dislodged by ordinary shocks, strains, vibrations, or other phenomena that usually serve to loosen fastening devices.

A further object of the invention is to provide a fastener of the general character referred to which is simple in construction, which can be easily and quickly operated, and which requires no special tools or equipment for its application or removal.

It is another object of the invention to provide a joint construction including a fastener pin between two relatively movable parts, which pin is so engaged with the said parts as to be normally yieldingly held in position urging the parts in opposite directions.

It is another object of the invention to provide a joint construction of the general character referred to in which the pin and the connected parts are so related as to maintain the pin in a predetermined rotative position where it exerts pressure on the parts in a predetermined manner.

Another object of the invention is to provide a construction involving two parts to be connected, and a simple, unitary, drive pin that connects the parts and which is strong and effective, and which involves resilience that acts to maintain the assembly tight and free of play or looseness such as might result in wear or undesirable noise, etc.

A further object of the invention is to provide a locking pin or fastener for connecting relatively movable parts, which pin is characterized by like elongate symmetrical metal sections universally movable relative to each other and combined with a spreader preferably in the form of a body of rubber acting between the sections and normally yieldingly holding them in a predetermined relation to each other and in pressure engagement with the connected parts.

The present invention is applicable to or can be incorporated in various structures or machines. The invention can be used in most situations where ordinary bolts or like fasteners are now employed. Without in any way limiting or restricting the range of use of the invention, I will refer to a few typical fields of use, so that the universal nature of the invention will be fully understood.

Typical uses or applications of the invention may occur in digging or excavating machinery where teeth, bucket parts, and elements generally are required to be secured together. The invention can also be employed, generally, in connection with vehicles such as motor vehicles, railway equipment, and the various parts and elements that are used in connection therewith, as an example, the invention can be used to advantage in brake rigging for railroad cars, in rail joints, and in other such situations. Again, the invention can be used in connection with tools, and the like, where cutters, tools, or devices of various kinds are required to be held, as by shanks, stems, or other mountings. The invention can also be used to advantage in structures such as occur in ships, bridges, etc. In other cases the invention can be used to advantage in machinery generally as, for instance, in connection with engines, in special machines of various kinds, and in the mountings provided for machines or engines, etc. More specifically, the invention is applicable in machines and machinery or parts thereof such as are required to be connected together, or for the connecting of chain links, etc. The particular application of the invention hereinafter set forth is given in way of example only.

A construction employing the present invention may include a part in the form of a shank projecting from a bucket or implement and having a forwardly tapered or diverging tip at its leading end. A second part may be a cap engaged over the tip. A typical cap may have a heavy, flat blade that bears on the top of the top and which has a sharpened forward end. The cap has sides that depend from the edges of the blade and fit against the sides of the tip and are preferably coextensive therewith. A bottom connects and extends between the sides of the cap and engages the bottom or under side of the tip. A bore is provided transversely through the tip from one side to the other, and is preferably elongated somewhat in cross section in a direction lengthwise of the tip. Correspondingly shaped and aligned holes are provided in the sides of the cap and are positioned to be somewhat forward of the hole or opening provided in the tip. A retainer in the form of a pin is engaged through the cap and tip and involves a body portion that is received in the tip and like enlargements or heads on ends of the body portion that are received in the holes in the sides of the cap. The enlargements or heads of the pin establish inwardly facing shoulders that engage the sides of the tip adjacent the hole provided in the tip. The pin is of laminated or sectional construction and involves two like metal sections, each substantially semi-circular in cross section, and a spreader section, preferably a body of rubber that is arranged between and which is preferably bonded to the metal sections, normally yieldingly urging them apart and maintaining the pin tight in connection with the tip and cap. The ends of the pin may be flush with the outer faces of the sides of the cap.

The various objects and features of my invention will be fully understood from the following detailed description of a typical preferred form and application of the invention, throughout which description reference is made to the accompanying drawings, in which:

Fig. 1 is a front elevation of an implement in the form of a bucket having a plurality of digger teeth projecting therefrom, the teeth having the present invention incorporated therein. Fig. 2 is a side elevation of the structure shown in Fig. 1. Fig. 3 is an enlarged view of a portion of the structure shown in Fig. 1, being a view taken as indicated by line 3—3 on Fig. 1, showing the tip portion of a shank and a cap in place on the tip. Fig. 4 is a view similar to Fig. 3 showing the parts in section and being an enlarged view taken as indicated by line 4—4 on Fig. 1. Fig. 5 is an enlarged detailed sectional view taken substantially as indicated by line 5—5 on Fig. 3 and showing the retaining pin in elevation. Fig. 6 is an enlarged view taken as indicated by line 6—6 on Fig. 3, showing the tip of the shank and the cap thereon, but not the retaining pin. Fig. 7 is a view of the parts shown in Fig. 6, showing the retaining pin in place in connection with the tip and cap. Fig. 8 is a perspective view of the retaining pin. Fig. 9 is a detailed transverse sectional view of the retaining pin taken as indicated by line 9—9 on Fig. 8 and Fig. 10 is a detailed transverse sectional view taken as indicated by line 10—10 on Fig. 6.

As hereinabove pointed out the structure provided by this invention is applicable to machinery and mechanical equipment generally. However, since it is particularly practical and can be used to advantage in connection with a digger tooth and cap, it will be described in this particular application. It is to be understood, of course, that as the invention is adapted to or incorporated in various other machines or equipment it may be modified or varied as circumstances require.

In the drawings an implement in the form of a bucket A is shown provided with a plurality of forwardly projecting digger teeth B. Each tooth is shown as involving a forwardly projecting shank 10 with a flat front face 11 and a tip 12 projecting forward from the face of the shank. A cap 13 is applied to or over the tip of the shank and a retainer 14 in the form of a pin releasably secures the cap in operating position on the tip.

In the preferred form of construction the shank 10 and tip 12 form a rigid unitary element. The tip in this particular case is one main element of the structure and is forwardly convergent or tapered and in the form illustrated it involves a flat forwardly extending top 15, a flat forwardly extending bottom 16 and flat parallel sides 17. The top 15 and bottom 16 converge and come together or terminate at a forward point 19.

The cap 13, which is another main part, may vary widely in form and construction, it being preferably a unit which is applied to and which encases the tip 12. In the case illustrated the cap 13 involves a top or blade 20 with a forwardly projecting portion having a sharpened edge 21. The blade 20 is arranged over and bears on the top 15 of the tip. Sides 22 depend from the edges of the blade 20 and fit over or against the sides 17 of the tip. It is preferred that the sides or cheeks 22 of the cap be made the same size and shape as the sides 17 of the tip to be coextensive therewith, as shown throughout the drawings. A bottom 23 joins or extends between the lower edge portions of the cheeks 22 and bears on or fits against the bottom 16 of the tip.

In practice the tip above described is a fabricated element or unit, the bottom and cheeks being formed of a sheath, shaped and bent in the desired manner, and the upper edges of the cheeks 22 are permanently or rigidly joined to the blade 20 as by welding, or the like. In the drawings welding material is shown at 25 permanently bonding the cheeks 22 to the blade 20. In the particular case illustrated a tongue 30 projects from the rear or inner end of blade 20 and extends into a suitable socket 31 provided in the front face 11 of the shank 10 immediately above the tip.

The retainer 14 provided by the present invention is in the nature of a pin and to accommodate the retainer a transverse opening 40 is provided through the tip 12 from one side thereof to the other, and openings 41 are provided in the cheeks 22 of the cap and communicate with the opening 40 in the tip when the cap is in place on the tip. It is preferred that the bore or opening 40 through the tip be elongated somewhat in cross sectional configuration in the direction in which the tip extends or projects from the face 11 and, as shown throughout the drawings, the openings 41 in the cheeks 22 may be likewise elongated in cross section.

The retainer pin 14 provided by the invention is an elongate unit engageable with or applicable to the assembled cap and tip, as by driving, and when in place or operating position it extends through both the cap and the tip and has a body portion X carried or engaged in the opening 40 of the tip while head portions Y engage in or are carried by the openings 41 in the cheeks 22. In accordance with the invention the heads Y of the pin are in the nature of enlargements on the ends of the body portion X forming inwardly facing or opposed shoulders 50 which engage the sides 17 of the tip when the pin is in place (see Fig. 7 of the drawings).

The pin 14 is a fabricated or sectional structure preferably involving two like metal sections 51 and a center or spreader section 52 that occurs between the metal sections. The metal sections are preferably alike and extend longitudinally of the pin and each has an outer convex face 55 and an inner flat face 56. In the preferred construction the faces 55 and 56 are so shaped and proportioned that the body portion of each metal pin section is substantially semi-circular in cross sectional configuration, as shown in Fig. 9. The head portion Y of each metal pin section has a convex outer face 57 and an inner face substantially continuous with the inner face of the body section. In the particular case illustrated the flat inner sides 58 of the heads are slightly offset outwardly from the flat face 56 of the body portions. The head portions 57 project from the body portions of the pin sections to establish the opposed shoulders 50 and these shoulders are spaced apart to receive or accommodate the tip in the manner shown in Fig. 7 of the drawings.

The spreader section 52 normally yieldingly holds the metal sections of the pin apart and in the preferred form of the invention it is a body or strip of rubber, or the like, confined between the flat inner faces of the metal pin sections. When I use the term "rubber," I means to include not only rubber or compositions containing rubber, but I means to include any material or composition or combination of materials that may have the charactertistics of rubber or that will serve in the construction as will a pad of rubber, or the like. It is preferred to permanently bond the rubber spreader 52 to the metal sections of the pin so that these parts form a permanent or unitary assembly. By making the spreader or pad of rubber substantially coextensive with the flat inner sides of the metal section, the pin, when in place, completely occupies the openings in the connected parts and thus eliminates danger of fouling by foreign matter or dirt that might otherwise enter the structure. In the preferred form of the invention the outer end corners 60 of the pin are preferably beveled or dressed away to facilitate entrance of the pin into the openings 40 and 41. Further, the outer ends 60ª of the heads on the metal sections are preferably flat and in planes normal to the longitudinal axis of the pin so they form faces receiving a hammer or other driving tool.

The retainer pin constructed as above described and as clearly illustrated in the drawings, particularly Figs. 8 and 9 of the drawings, is applied after the cap 13 has been engaged over the tip 12. The pin is introduced from one side of the structure, that is, through one of the holes 14 in the cap and the parts are so arranged and proportioned that for complete introduction of the pin it must be forced or driven into place in the course of which operation it passes through the opening 40 in the tip and finally projects into the other opening 41 in the cap. With a preferred relationship of parts the end faces 60ª of the pin sections are flush with the outer faces of the cheeks 22 when the pin is in working position. As the pin is driven or forced into place the retainer section 52 thereof is compressed or deformed, putting the body of rubber under pressure so that it normally yieldingly urges the metal sections of the pin apart. When the pin is in place, as shown in Fig. 7 of the drawings, it bears against the forward wall of opening 40, as indicated by the arrow a in Fig. 7, and bears against the rear walls of the openings 41, as indicated by the arrows b in Fig. 7. As the pin thus exerts pressure on the tip and cap these parts are held securely or tightly engaged or wedged together and the pin will remain in operating position due to the shoulders 50 engaging the sides 17 of the tip. The shoulders 50 are made of such extent or shape as to effectively maintain the pin in position under working conditions. However, it is possible to apply sufficient force or pressure to the pin, as by driving, to dislodge it when necessary. This can be done by striking the pin with a hammer, or the like.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A retaining pin of the character described including, two like rigid separate elongate metal sections extending longitudinally of the pin from one end to the other thereof, and a rubber pad between and spacing the sections apart laterally of the pin, the pad being substantially coextensive with the pin sections and permanently bonded thereto, each section having an elongate body and like heads at the ends of the body projecting from the body laterally of the pin only in the direction that the sections are spaced laterally by the pad, the heads establishing laterally extending shoulders at the ends of the body and opposing each other, the normal thickness of the pad between the sections being substantially greater than the projection of the shoulders laterally of the body.

2. A retaining pin of the character described including, two substantially identical rigid separate elongate metal sections extending longitudinally of the pin from one end to the other thereof, and a rubber pad between and spacing the sections apart laterally of the pad, the pad being substantially coextensive with the sections and permanently bonded thereto, each section having an elongate body substantially semi-circular in cross-section and like heads at the ends of the body projecting from the body laterally of the pin and establishing laterally extending shoulders at the ends of the body and opposing each other, the spacing of the sections by the pad being of substantially greater extent than the shoulders laterally of the body and the heads of the two sections projecting from the bodies in opposite directions relative to the pad.

3. A retaining pin of the character described including, two like rigid separate elongate metal sections extending longitudinally of the pin from one end to the other thereof, and a rubber pad between and spacing the sections apart laterally of the pin, the pad being substantially coextensive with the pin sections and permanently bonded thereto, each section having an elongate body and like heads at the ends of the body projecting from the body laterally of the pin only in the direction that the sections are spaced laterally by the pad, the heads establishing laterally extending shoulders at the ends of the body and opposing each other, the normal thickness of the pad between the sections being substantially greater than the projection of the shoulders laterally of the body, the bodies having portions adjoining the heads which portions have convexly curved exteriors and are the parts of the bodies of maximum extent transversely of the pin.

4. A retaining pin of the character described including, two like rigid separate elongate metal sections extending longitudinally of the pin from one end to the other thereof, and a rubber pad between and spacing the sections apart laterally of the pin, the pad being substantially coextensive with the pin sections and permanently bonded thereto, each section having an elongate body and like heads at the ends of the body projecting from the body laterally of the pin only in the direction that the sections are spaced laterally by the pad, the heads establishing laterally extending shoulders at the ends of the body and opposing each other, the normal thickness of the pad between the sections being substantially greater than the projection of the shoulders laterally of the body, the exteriors of the heads and the exteriors of the bodies adjacent the heads being convexly curved and having substantially the same radius, the exterior of each head being curved about a center spaced from the center of curvature of the body portion adjacent thereto in a direction away from the pad.

5. A retaining pin of the character described including, two like rigid separate elongate metal sections extending longitudinally of the pin from one end to the other thereof, and a rubber pad between and spacing the sections apart laterally of the pin, the pad being substantially coextensive with the pin sections and permanently bonded thereto, each section having an elongate body and like heads at the ends of the body bodily offset relative to the body to project from the body laterally of the pin only in the direction that the sections are spaced laterally by the pad, the heads establishing laterally extending shoulders at the ends of the body and opposing each other, the normal thickness of the pad between the sections being substantially greater than the projection of the shoulders laterally of the body.

6. A retaining pin of the character described including, two like rigid separate elongate metal sections extending longitudinally of the pin from one end to the other thereof, and a substantially flat rubber pad between and separating the sections and disposed diametrically of the pin and substantially coextensive with the sections and permanently bonded thereto, each section having an elongate body extending lengthwise of the pin and of substantially uniform cross-section throughout its length and having like heads adjoining the ends of the body and bodily offset from the body laterally of the pin and in a direction normal to the plane of the pad, the exteriors of the heads and the exteriors of the bodies being convex and of substantially the same radius, the exteriors of each head being curved about an axis spaced from the axis of curvature of the body adjacent thereto in a direction away from the pad normal to the plane thereof.

ERNIE L. LAUNDER.

References Cited in the file of this patent

UNITED STATES PATENTS

| Number | Name | Date |
|---|---|---|
| 352,942 | Wood | Nov. 23, 1886 |
| 845,121 | Reniff | Feb. 26, 1907 |
| 2,100,658 | Finch | Nov. 30, 1937 |
| 2,259,456 | Crawford | Oct. 21, 1941 |
| 2,279,960 | Terry | Apr. 14, 1942 |
| 2,310,016 | Doberstein | Feb. 2, 1943 |
| 2,568,075 | Launder | Sept. 18, 1951 |